2,900,398
PROCESS FOR THE MANUFACTURE OF STEROID DEHYDROGENATION PRODUCTS

Albert Wettstein and Alfred Hunger, Basel, Charles Meystre, Arlesheim, and Ludwig Ehmann, Basel, Switzerland, assignors to Ciba Pharmaceutical Products Inc., Summit, N.J.

No Drawing. Application June 11, 1957
Serial No. 664,920

Claims priority, application Switzerland June 15, 1956

10 Claims. (Cl. 260—397.4)

This invention relates to an improvement in the manufacture of steroid dehydrogenation products, especially of $\Delta^{1,4}$-3-oxo-steroids of the pregnane—or androstane series, such as the well known highly active hormone compounds 1-dehydro-cortisone and 1-dehydro-hydrocortisone.

It is known that $\Delta^{1,4}$-3-oxo-steroids are obtained when 3-oxo-steroids are treated with selenium compounds having a dehydrogenating action. In individual cases, especially with certain 3-oxo-steroids saturated in the ring A, this process is not entirely satisfactory since the yield of $\Delta^{1,4}$-3-oxo-compound leave something to be desired.

The present invention is based on the observation that the yields in the above dehydrogenation can be improved when the dehydrogenation reaction is carried out in the presence of a metal of the second or eighth group of the periodic system. A further feature of the invention is based on the observation that from the mother liquors obtained by the recrystallization of the crude $\Delta^{1,4}$-3-oxo-steroids formed by the known or by the new process, further quantities of the desired final product can be obtained when the residues of these mother liquors, obtained after separation of the purified crystalline $\Delta^{1,4}$-3-oxo-steroids and evaporation of the solvent are treated with nickel or iron and, if desired, subsequently again with the selenium compound of dehydrogenating activity in the presence of a metal of the second or eighth group of the periodic system.

The process of the present application for the dehydrogenation of 3-oxo-steroids to $\Delta^{1,4}$-3-oxo-steroids by means of selenium compounds of dehydrogenating activity is thus characterised in that the dehydrogenation is carried out in the presence of a metal of the second or eighth group of the periodic system. A special feature of this process consists in treating the selenium-containing fraction obtained after separation of the crystallized $\Delta^{1,4}$-3-oxo-steroids obtained by the dehydrogenation of a 3-oxo-steroid by means of a selenium compound having a dehydrogenating action with nickel or iron, and if desired, subjecting the reaction products again to a treatment with a selenium compound of dehydrogenating action in the presence of metals of the second or eighth groups of the periodic system.

Especially suitable metals are magnesium, zinc, cadmium, mercury and manganese, iron, cobalt, nickel, which are used in finely divided form, care being taken during the dehydrogenation reaction that a thorough mixing of the reacting materials takes place. The reaction products obtained according to the present process, compared with the reaction products obtained without the addition of metal, are less deeply coloured and can be purified in a simpler manner.

From the selenium containing fraction of the reaction products, obtained after separation of the crystallized $\Delta^{1,4}$-3-oxo-steroids, further quantities of 1-dehydro-steroids can be obtained by treatment with nickel or iron in a suitable solvent; deactivated Raney nickel is primarily suitable such as is obtained for example by boiling active Raney nickel in a ketone such as acetone or methyl-ethyl ketone, and iron powder. A suitable solvent is for example an alcohol or ketone. When nickel is used the crystallized fractions obtained from the reaction product constitute a mixture of 3-oxo-steroids which are completely or partially dehydrogenated in the ring A, since under the conditions used the deactivated nickel is capable of partial reduction of the $\Delta^{1,4}$-3-oxo-grouping. For working up to the desired $\Delta^{1,4}$-3-oxo-steroids, the resulting reaction products are therefore again treated with the selenium compound of dehydrogenating action, especially with selenium dioxide or selenious acid, in the presence of a tertiary alcohol such as tertiary butanol or tertiary amyl alcohol and of a metal of the second or eighth group of the periodic system.

The advantages that the new process offers can be seen from the examples below. When, for example, 3,11,20-trioxo-17α-hydroxy-21-acetoxy-pregnane is dehydrogenated by the known method with selenium dioxide, a reaction product is obtained from which about 40% of 1-dehydro-cortisone acetate can be isolated. When the dehydrogenation is carried out in the presence of mercury or zinc, the yield is increased to above 60%. On the other hand it was not hitherto possible to recover further crystallized fractions from the mother liquors of 1-dehydro-cortisone or its 21-esters (obtained by dehydrogenation of cortisone, 3,11,20-trioxo-17α-21-dihydroxy-pregnane, 3,11,20-trioxo-17α,21-dihydroxy-allopregnane, or its 21-esters by the known selenium dioxide process). By treatment of the residues of these mother liquors with deactivated Raney nickel and renewed dehydrogenation of the reaction product with selenium dioxide, it is now possible by the present process to obtain a further quantity of about 4–10% of 1-dehydro-compound. Similar yield improvements may be achieved when using as starting materials 3-oxo-steroids of the androstane or testane series, which represents a remarkable progress for instance in the manufacture of certain 17α-substituted 1-dehydro-testosterones with anabolic action, such as 1-dehydro-17α-methyl-testosterone.

The following examples illustrate the invention:

Example 1

To 1.21 grams of 3,11,20-trioxo-17α-hydroxy-21-acetoxy-pregnane in 20 ml. of tertiary amyl alcohol and 1.0 ml. of glacial acetic acid, after the addition of 1.2 grams of mercury, at reflux temperature and with brisk stirring, 0.74 gram of selenium dioxide in 33 ml. of tertiary amyl alcohol is added dropwise and the whole is boiled under reflux for 14 hours. Separated selenium, mercury selenide and mercury are filtered off, the filtrate is diluted with ethyl acetate and the ethyl acetate solution is shaken with ammonium sulphide and sodium carbonate solution, dried and evaporated. From the residue, by crystallisation from acetone-ether, 0.73 gram of 1-dehydro-cortisone acetate is obtained. 0.5 gram remains of a non-crystallising mother liquor product.

The 0.5 gram of mother liquor product is stirred for 5 hours under reflux with 5 grams of a deactivated Raney nickel suspension prepared by boiling of active Raney nickel in methyl-ethyl ketone, and 50 cc. of methly-ethyl ketone. After removal of the nickel by filtration and evaporation of the solvent, 0.37 gram is obtained of crystalline residue which, as above described, is dissolved in 10 cc. of tertiary amyl alcohol and 0.5 cc. of glacial acetic acid and dehydrogenated with 0.23 gram of selenium dioxide in 10 cc. of tertiary amyl alcohol in the presence of 0.5 gram of mercury. Working up by the method described above yields a further 0.12 gram of 1-dehydro-cortisone acetate. The total yield thus amounts to 0.85 gram of 1-dehydro-cortisone acetate.

When the dehydrogenation is carried out without the addition of mercury and the mother liquors are not further treated according to the present process, from 1.21 grams of the above starting material 0.43 gram of 1-dehydro-cortisone acetate is obtained:

To 1.21 gram of 3,11,20-trioxo-17α-hydroxy-21-acetoxy-pregnane in 20 ml. of tertiary amyl alcohol and 10 ml. of glacial acetic acid, at reflux temperature and with stirring, 0.74 gram of selenium dioxide in 33 ml. of tertiary amyl alcohol is added dropwise and the whole is stirred under reflux for 14 hours. The separated selenium is filtered off and the filtrate diluted with ethyl acetate and the ethyl acetate solution is washed with ammonium sulphide and sodium carbonate solution, dried and evaporated. From the residue, by crystallization from acetone, 0.43 gram of 1-dehydro-cortisone acetate is obtained.

*Example 2*

When 10 grams of cortisone acetate are dehydrogenated with selenium dioxide, as described in Helv. Chim. Acta 39, 734 (1956), 8.0 grams of crystalline 1-dehydro-cortisone acetate and 2.0 grams of a mother liquor product are obtained, from the latter of which neither by crystallisation nor by other purification methods can further 1-dehydro-cortisone acetate be obtained.

The 2.0 grams of mother liquor product are boiled for 5 hours under reflux in 50 ml. of methyl-ethyl ketone with 20 grams of deactivated Raney nickel and the product is filtered from nickel and evaporated. 1.0 gram of a crystalline residue is obtained, consisting for the most part of cortisone acetate and 1-dehydro-cortisone acetate.

This residue, as described in Example 1, is dehydrogenated in 30 ml. of tertiary amyl alcohol and 1 ml. of glacial acetic acid in the presence of 1 gram of mercury with 0.6 gram of selenium dioxide dissolved in 15 ml. of tertiary amyl alcohol and the product is worked up. In this manner a further 0.4 gram of 1-dehydro-cortisone acetate is obtained.

*Example 3*

A suspension of 30 grams of 17α-methyl-testosterone and 10 grams of selenium dioxide in 600 cc. of tertiary amyl alcohol is treated with 60 grams of magnesium powder and 6 cc. of glacial acetic acid. The mixture is refluxed for 24 hours with good stirring in an atmosphere of nitrogen, another 10 grams of selenium dioxide being added after 10 hours. After some cooling, the suspension is filtered through some "hyflo" and washed thoroughly with ethyl acetate. The resulting brown solution is evaporated in vacuo and the residue dissolved in ethyl acetate. The ethyl acetate solution is then washed with water, dried and evaporated. To remove any selenium still present, the residue is dissolved in 200 cc. of methanol and mixed with 100 grams of iron powder and 2 grams of active carbon. The mixture is heated for 30 minutes with stirring under reflux, then filtered with suction, washed with methanol and the solution evaporated in vacuo. The residue is then chromatographed on 900 grams of aluminum oxide. The residues of the evaporated benzene and ether fractions are treated with active carbon in methanol or acetone, evaporated again, and the residue recrystallized from a mixture of acetone and ether. There are obtained 17.5 grams of pure 1-dehydro-17α-methyl-testosterone which melts at 163–164° C. From the mother liquors there can be obtained a small quantity of the same 1-dehydro-compound having a somewhat lower melting point. The further eluates of the chromatography, obtained with ethyl acetate and acetone, when recrystallized from acetone, give 4.2 grams of a mono-selenium derivative of 1-dehydro-testosterone of melting point 282–284° C.

When in the dehydrogenation there are added 130 grams of iron powder instead of the magnesium, there is obtained the same yield of 1-dehydro-17α-methyl-testosterone and of mono-selenium derivative. However, if the same reaction is made without magnesium or iron there are obtained on working up in the same manner only 4.5 grams of 1-dehydro-17α-methyl-testosterone of melting point 163–164° C. and 19.5 grams of the mono-selenium derivative of melting point 282–284° C.

*Example 4*

A suspension of 5 grams of 17α-ethinyl-testosterone, 3 grams of selenium dioxide and 40 grams of iron powder in 400 cc. of tertiary amyl alcohol and 4 cc. of glacial acetic acid is refluxed with stirring in an atmosphere of nitrogen for 48 hours, another 3 grams of selenium dioxide being added after 24 hours. The reaction mixture is worked up as described in Example 3. The residue which is obtained is chromatographed over 150 grams of alumina. The benzene and ether eluates are treated together with some active carbon in methanol or acetone and then recrystallized from acetone or a mixture of acetone and isopropyl ether. There are obtained 2.8 grams of 1-dehydro-17α-ethinyl-testosterone of melting point 228–233° C. From the mother liquors there can be isolated small quantities of the same 1-dehydro compound having a somewhat lower melting point. From the further ethyl acetate and acetone eluates of the chromatography selenium-containing derivatives are obtained.

When in this reaction the iron powder is replaced by 20 grams of magnesium powder there is obtained under otherwise identical conditions the same yield of 1-dehydro-17α-ethinyl-testosterone.

However, if the reaction is carried out in the absence of iron or magnesium under otherwise identical conditions, only 550 mg. of the pure 1-dehydro-17α-ethinyl-testosterone of melting point 228–233° C. can be isolated.

*Example 5*

To 5.0 grams of 3,11,20-trioxo-17-hydroxy-21-acetoxy-allopregnane in 120 ml. of tertiary amyl alcohol and 2.5 ml. of glacial acetic acid there are added dropwise after the addition of 1.2 grams of mercury, at reflux temperature and with brisk stirring 6.9 grams of selenium dioxide in 70 ml. of tertiary amyl alcohol, and the whole is boiled under reflux for 14 hours. Separated selenium mercury selenide and mercury are filtered off, the filtrate is diluted with ethyl acetate and the ethyl acetate solution is shaken with ammonium sulfide and sodium carbonate solution, dried and evaporated. From the residue there are obtained by crystallization from acetone-ether 3.1 grams of 1-dehydro-cortisone acetate.

When the dehydrogenation is carried out in the same manner, but without the addition of mercury, there are obtained from 5 grams of the above starting material 2.2 grams of 1-dehydro-cortisone-acetate.

What is claimed is:

1. In a process for the dehydrogenation of steroids of the pregnane, androstane and testane series substituted in 3-position by an oxo group and which are at most unsaturated in ring A in the 4,5-position by means of selenium dioxide, the improvement wherein the dehydrogenation is carried out in the presence of mercury.

2. Process according to claim 1, wherein the selenium-containing fraction obtained after separation of the crystallized $\Delta^{1,4}$-steroid substituted by an oxo group in 3-position obtained by the dehydrogenation of a steroid substituted in 3-position by an oxo group and saturated at least in one of the positions 1,2 and 4,5 by means of a selenium dioxide is treated with a member selected from the group consisting of nickel and iron.

3. Process according to claim 2, wherein the treatment with a member selected from the group consisting of nickel and iron is carried out in the presence of a member selected from the group consisting of an alcohol and a ketone.

4. Process according to claim 2, wherein the reaction products obtained are again subjected to a treatment with selenium dioxide in the presence of mercury.

5. Process according to claim 1, wherein there is used as starting material a member selected from the group consisting of a 3-oxo-steroid of the pregnane and the allopregnane series.

6. Process according to claim 5, wherein 3,11,20-trioxo-17α-hydroxy-21-acetoxy-pregnane is used as starting material.

7. Process according to claim 5, wherein 3,11,20-trioxo-17α-hydroxy-21-acetoxy-allopregnane is used as starting material.

8. Process according to claim 1, wherein there is used as starting material a member selected from the group consisting of a 3-oxo-steroid of the androstane and the testane series.

9. Process according to claim 8, wherein there is used as starting material 17α-methyl-testosterone.

10. Process according to claim 8, wherein there is used as starting material 17α-ethinyl-testosterone.

References Cited in the file of this patent

Helv. Chem. Acta., vol. 39, 1956, 734–742, Meystre et al.

J. Org. Chem., vol. 21, 1956, 239–240, Ringold et al.

Rec. Trav. Chim Des-Pays Bas, 1956, vol. 75, pages 475–480, Szpelfogel et al.